United States Patent
Heo et al.

(10) Patent No.: US 10,471,960 B2
(45) Date of Patent: Nov. 12, 2019

(54) ADAPTIVE CRUISE CONTROL APPARATUS AND METHOD OF OPERATING ADAPTIVE CRUISE CONTROL IN CONSIDERATION OF TRAFFIC CONDITION

(71) Applicants: HYUNDAI MOTOR COMPANY, Seoul (KR); KIA MOTORS CORPORATION, Seoul (KR)

(72) Inventors: Myung Seon Heo, Seoul (KR); Byung Yong You, Suwon-si (KR); Ki Cheol Shin, Seongnam-si (KR); Young Chul Oh, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/593,615

(22) Filed: May 12, 2017

(65) Prior Publication Data

US 2017/0327116 A1  Nov. 16, 2017

(30) Foreign Application Priority Data

May 13, 2016 (KR) .............. 10-2016-0058770
May 8, 2017 (KR) .............. 10-2017-0057499

(51) Int. Cl.
*B60W 30/16* (2012.01)
*B60W 30/14* (2006.01)
(Continued)

(52) U.S. Cl.
CPC ...... *B60W 30/16* (2013.01); *B60W 30/18018* (2013.01); *B60W 2550/20* (2013.01); *B60W 2720/106* (2013.01)

(58) Field of Classification Search
CPC .......... B60W 30/16; B60W 30/18018; B60W 2550/20; B60W 2720/106
(Continued)

(56) References Cited

U.S. PATENT DOCUMENTS

2013/0124012 A1* 5/2013 Shida .................. G08G 1/0104
701/2
2016/0040630 A1* 2/2016 Li ...................... F02M 25/0809
73/40.5 R

FOREIGN PATENT DOCUMENTS

JP    2001-26226 A    1/2001
JP    2002-92782 A    3/2002
(Continued)

OTHER PUBLICATIONS

Office Action issued in Korean Application No. 10-2017-0057499 dated Oct. 30, 2018, with English translation.

*Primary Examiner* — Nga X Nguyen
(74) *Attorney, Agent, or Firm* — Morgan, Lewis & Bockius LLP (57) ABSTRACT

An adaptive cruise control apparatus includes a sensor device for acquiring information on vehicles around a subject vehicle including information on a distance between a forward vehicle and the subject vehicle, and a controller for calculating an acceleration of the subject vehicle based on the information on vehicles around the subject vehicle, determining a traffic condition around the subject vehicle based on the information on vehicles around the subject vehicle, limiting the acceleration of the subject vehicle according to the determined traffic condition, and controlling a power train of the subject vehicle according to the limited acceleration.

12 Claims, 3 Drawing Sheets

PRIOR ART

SUBJECT VEHICLE SPEED Ve

FORWARD VEHICLE SPEED Vp

CURRENT DISTANCE Dc

REFERENCE DISTANCE Dr (51) Int. Cl.
*B60W 40/04* (2006.01)
*B60W 30/02* (2012.01)
*B60W 30/18* (2012.01)

(58) Field of Classification Search
USPC .................................................. 701/300–302
See application file for complete search history.

(56) References Cited

FOREIGN PATENT DOCUMENTS

| | | |
|---|---|---|
| JP | 2005-145385 A | 6/2005 |
| JP | 2012-153296 A | 8/2012 |
| KR | 10-2014-0016017 A | 2/2014 |
| KR | 10-2014-0134332 A | 11/2014 |
| KR | 10-2015-0134059 A | 12/2015 |

\* cited by examiner

FIG. 1

PRIOR ART

FIG. 7

ADAPTIVE CRUISE CONTROL APPARATUS AND METHOD OF OPERATING ADAPTIVE CRUISE CONTROL IN CONSIDERATION OF TRAFFIC CONDITION

CROSS-REFERENCE TO RELATED APPLICATION

This application claims the benefit of priority to Korean Patent Applications No. 2016-0058770 filed on May 13, 2016 and No. 2017-0057499 filed on May 8, 2017 with the Korean Intellectual Property Office (KIPO), the entire contents of which are hereby incorporated by reference.

TECHNICAL FIELD

The present disclosure relates to an adaptive cruise control apparatus and a method of operating adaptive cruise control in consideration of a traffic condition, and more particularly, to an adaptive cruise control apparatus that limits acceleration of a subject vehicle when a driving environment around the subject vehicle is congested, and an operation method of the same.

BACKGROUND

A cruise control apparatus is an apparatus that propels a vehicle at a constant speed without a driver's operation. In recent years, a smart cruise control (SCC) apparatus or an adaptive cruise control (ACC) apparatus, which can control a traveling speed of a subject vehicle equipped in consideration of a speed of a forward vehicle and a distance to the forward vehicle, has been employed in addition to the conventional cruise control apparatus.

The adaptive cruise control thus provides the driver with enhanced driving considering convenience and safety. However, in a congested traffic condition, rapid acceleration or deceleration of the subject vehicle may frequently occur and may cause a problem of ride discomfort.

Accordingly, in addition to autonomous vehicle technology, interest in cruise control techniques that can provide driving safety and ride comfort to drivers on congested roads is greatly increasing, and research and development thereon is also being actively pursued.

SUMMARY

Accordingly, exemplary implementations of the present disclosure are provided to substantially obviate one or more problems due to limitations and disadvantages of the related art.

Exemplary implementations of the present disclosure provide an adaptive cruise control apparatus capable of preventing a deterioration of ride comfort due to a rapid acceleration or deceleration when a traffic condition is congested.

Exemplary implementations of the present disclosure also provide an adaptive cruise control method capable of preventing a deterioration of ride comfort due to a rapid acceleration or deceleration when a traffic condition is congested.

In order to achieve the above-described objective, an aspect of the present disclosure may provide an adaptive cruise control apparatus comprising a sensor device for acquiring information on vehicles around a subject vehicle including information on a distance between a forward vehicle and the subject vehicle; and a controller for calculating an acceleration of the subject vehicle based on the information on vehicles around the subject vehicle, determining a traffic condition around the subject vehicle based on the information on vehicles around the subject vehicle, limiting the acceleration of the subject vehicle according to the determined traffic condition, and controlling a power train of the subject vehicle according to the limited acceleration.

The information on vehicles around the subject vehicle may include information on a speed of the forward vehicle and a speed of a nearby vehicle traveling in an adjacent lane of the subject vehicle.

The controller may determine whether the traffic condition around the subject vehicle is congested or not.

The controller may determine that the traffic condition around the subject vehicle is congested when an average speed of the forward vehicle is equal to or less than a predetermined first reference speed and the forward vehicle stops more than a predetermined number of times during a predetermined reference time.

The controller may determine that the congested traffic condition is resolved when the average speed of the forward vehicle exceeds a predetermined second reference speed and the forward vehicle stops less than a predetermined number of times during the predetermined reference time.

The controller may determine that the traffic condition around the subject vehicle is congested when an average speed of the nearby vehicle around the subject vehicle exceeds a first predetermined percentage of an average speed of the forward vehicle.

The controller may determine that the congested traffic condition around the subject vehicle is resolved when the average speed of the nearby vehicle does not exceed a second predetermined percentage of the average speed of the forward vehicle.

The controller may limit the acceleration of the subject vehicle by limiting the acceleration of the subject vehicle to zero when a speed of the subject vehicle exceeds the speed of the forward vehicle by a predetermined value or by limiting the acceleration of the subject vehicle to a preset maximum allowed acceleration when the calculated acceleration of the subject vehicle is greater than the preset maximum allowed acceleration.

In order to achieve the above-described objective, another aspect of the present disclosure may provide an adaptive cruise control method comprising acquiring information on vehicles around a subject vehicle including information on a distance between a forward vehicle and the subject vehicle; and calculating an acceleration of the subject vehicle based on the information on vehicles around the subject vehicle, determining a traffic condition around the subject vehicle based on the information on vehicles around the subject vehicle, limiting the acceleration of the subject vehicle according to the determined traffic condition, and controlling a power train of the subject vehicle according to the limited acceleration.

The information on vehicles around the subject vehicle may include information on a speed of the forward vehicle and a speed of a nearby vehicle traveling in an adjacent lane of the subject vehicle.

The traffic condition around the subject vehicle may be determined as congested or not based on the information on vehicles around the subject vehicle.

The traffic condition around the subject vehicle may be determined to be congested when an average speed of the forward vehicle is equal to or less than a predetermined first reference speed and the forward vehicle stops more than a predetermined number of times during a predetermined reference time.

The congested traffic condition may be determined to be resolved when the average speed of the forward vehicle exceeds a predetermined second reference speed and the forward vehicle stops less than a predetermined number of times during the predetermined reference time.

The traffic condition around the subject vehicle may be determined to be congested when an average speed of the nearby vehicle around the subject vehicle exceeds a first predetermined percentage of an average speed of the forward vehicle.

The congested traffic condition around the subject vehicle may be determined to be resolved when the average speed of the nearby vehicle does not exceed a second predetermined percentage of the average speed of the forward vehicle.

The acceleration of the subject vehicle may be limited by limiting the acceleration of the subject vehicle to zero when a speed of the subject vehicle exceeds the speed of the forward vehicle by a predetermined value or by limiting the acceleration of the subject vehicle to a preset maximum allowed acceleration when the calculated acceleration of the subject vehicle is greater than the preset maximum allowed acceleration.

According to implementations of the present disclosure, a rapid acceleration or deceleration of a subject vehicle can be prevented by limiting the magnitude of the acceleration of the subject vehicle according to a traffic condition around the subject vehicle, so that a good ride comfort can be provided to a driver of the subject vehicle.

Also, the adaptive cruise control apparatus and method can be implemented without any additional hardware, so that cost increases due to improved product quality can be minimized.

BRIEF DESCRIPTION OF DRAWINGS

Exemplary implementations of the present disclosure will become more apparent by describing in detail exemplary implementations of the present disclosure with reference to the accompanying drawings, in which.

DETAILED DESCRIPTION

Implementations of the present disclosure are disclosed herein. However, specific structural and functional details disclosed herein are merely representative for purposes of describing implementations of the present disclosure. Implementations of the present disclosure may be embodied in many alternate forms and should not be construed as limited to implementations of the present disclosure set forth herein.

Accordingly, while the present disclosure is susceptible to various modifications and alternative forms, specific implementations thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular implementations only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An adaptive cruise control apparatus according to the present disclosure may determine a speed of a subject vehicle equipped with the adaptive cruise control apparatus, and control the subject vehicle according to the determined speed. In this case, the apparatus may require a target vehicle (forward vehicle) to be a reference for the control of the subject vehicle. Thus, the adaptive cruise control apparatus according to the present disclosure may identify a forward vehicle to control the speed of the subject vehicle, set the identified forward vehicle as a target, detect a distance between the target forward vehicle and the subject vehicle, and prevent rapid acceleration or deceleration of the subject vehicle by detecting driving patterns and speeds of the target forward vehicle and vehicles around the subject vehicle.

As described above, in order to control the speed of the subject vehicle, the adaptive cruise control apparatus according to the present disclosure may actuate a brake without a driver's intervention, and make the subject vehicle follow the forward vehicle with a proper distance by controlling at least one of an engine, a motor, a transmission and the brake.

In some implementations according to the present disclosure, the forward vehicle may refer to a vehicle traveling in front of the subject vehicle in the same lane as the lane in which the subject vehicle is traveling, and a nearby vehicle may refer to a vehicle travelling in an adjacent lane of the lane in which the subject vehicle or the forward vehicle is travelling. Generally, in a case that a sensor device, which will be described later, is disposed in front of the subject vehicle, the nearby vehicle may be a vehicle travelling on the left or right of the forward vehicle, but is not limited thereto. Hereinafter, implementations according to the present disclosure will be described in detail with reference to the accompanying drawings.

Figure 1:
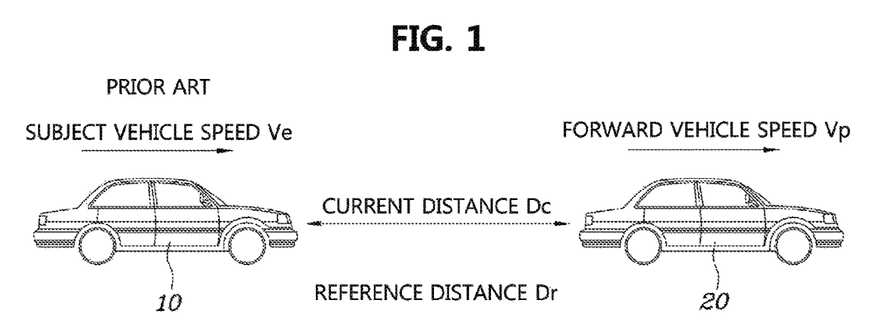
FIG. 1 is a conceptual diagram for explaining a concept of a conventional cruise control method according to the prior art.

FIG. 1 is a conceptual diagram for explaining a concept of a conventional cruise control method according to the prior art.

Referring to FIG. 1, according to a conventional cruise control method, an acceleration (a) of a subject vehicle 10 may be determined by applying a speed Ve of the subject vehicle 10, a speed Vp of a forward vehicle 20, a current distance Dc between the forward vehicle 20 and the subject vehicle 10, and a reference distance Dr between the forward vehicle 20 and the subject vehicle 10 to Equation 1. Here, the calculated acceleration may be defined as 'target acceleration' or 'required acceleration' in that it may become a target value of acceleration control on the subject vehicle 10.

$$a=Kv\times(Vp-Ve)+Kd\times(Dc-Dr) \qquad \text{[Equation 1]}$$

In Equation 1, Kv and Kd may be a preset velocity gain and a preset distance gain, respectively.

In the conventional cruise control method, a power train of the subject vehicle may be controlled according to the acceleration calculated based on Equation 1, and a driving with a proper speed may be provided to maintain a constant distance between the subject vehicle 10 and the forward vehicle 20. However, the conventional cruise control apparatus may frequently accelerate or decelerate to satisfy the calculated acceleration when a traffic condition is congested, and thus there may be a problem of lowering ride comfort.

Figure 2:
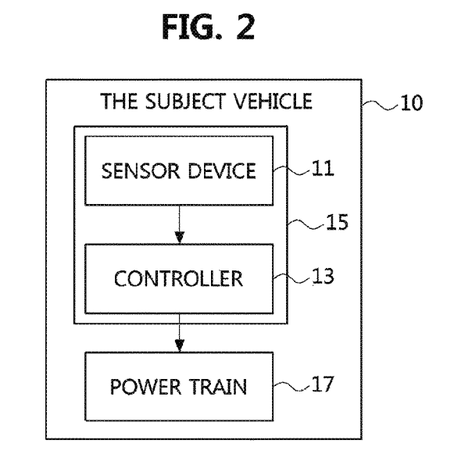
FIG. 2 is a block diagram illustrating an adaptive cruise control apparatus considering a traffic condition according to exemplary implementations of the present disclosure.

FIG. 2 is a block diagram illustrating an adaptive cruise control apparatus considering a traffic condition according to exemplary implementations of the present disclosure.

Referring to FIG. 2, an adaptive cruise control apparatus 15 according to implementations of the present disclosure may comprise a sensor device 11 and a controller 13. Here, each component may not be limited by its name, but may be defined by a function or a role, and the components may be integrated to perform their functions or roles.

The sensor device 11 may acquire information on the forward vehicle 20 and nearby vehicles around the subject vehicle 10, and the information may include speeds of the forward vehicle 20 and nearby vehicles around the subject vehicle 10 and/or distances from the subject vehicle 10 to the forward vehicle 20 and nearby vehicles around the subject vehicle 10. The sensor device 11 may include a known sensor such as a Radio Detection and Ranging (RADAR), a Light Detection and Ranging (LIDAR), or a camera which can acquire data of the forward vehicle 20 and the nearby vehicles, but is not limited thereto. Also, the sensor device 11 may use sensing data obtained by the sensor and data obtained by processing the sensing data in order to acquire the information on the forward vehicle 20 and the nearby vehicles.

Although the sensor device is explained as a single component in the above-described implementation, the sensor device 11 may also be implemented as including two or more sensors. In addition, sensing data obtained by two or more different types of sensors may be fused to acquire the information on the forward vehicle 20 and the nearby vehicles.

The controller 13 may calculate a target acceleration of the subject vehicle 10 using the data acquired by the sensor device 11 and may control a power train 17 of the subject vehicle 10 according to the calculated acceleration. Here, the power train 17 may include an engine or a motor for driving the subject vehicle 10.

In some implementations of the present disclosure, the controller 13 comprises a device for calculating the acceleration and a device for controlling the power train according to the calculated acceleration. For example, the controller 13 may comprise an engine control processor or a motor control processor for controlling the power train 17 according to the calculated acceleration and a processor for calculating the acceleration using the data acquired by the sensor device 11. Alternatively, the device for calculating the acceleration and the device for controlling the power train 17 may be implemented using a single processor.

The controller 13 may determine whether the traffic condition is congested by using the data acquired by the sensor device 11. When the traffic condition is determined to be congested, the controller 13 may limit the acceleration of the subject vehicle 10, and control the power train 17 according to the limited acceleration.

Further, the controller 13 may execute an algorithm for determining whether the traffic condition is congested and limit the acceleration of the subject vehicle 10 when the traffic condition is determined to be congested. After determining that the traffic condition is congested, the controller 13 may also execute an algorithm for releasing the limitation on the acceleration of the subject vehicle 10 when the congestion is determined to be released, or alleviated. Here, whether the traffic condition is congested may be determined using at least one of a driving pattern of the forward vehicle 20 and the speeds of the nearby vehicles.

Figure 3:
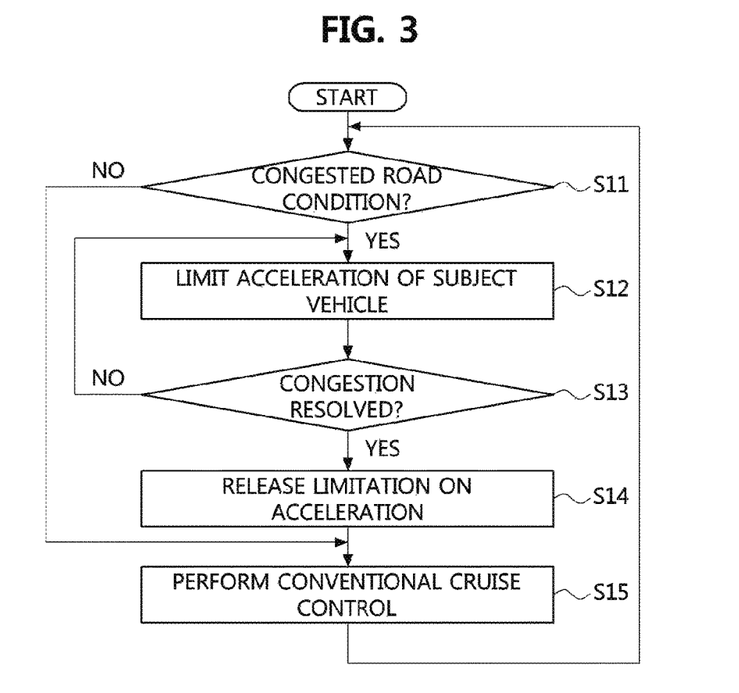
FIG. 3 is a flow chart for explaining an operation method of an adaptive cruise control apparatus in consideration of a traffic condition according to exemplary implementations of the present disclosure.

FIG. 3 is a flow chart for explaining an operation method of an adaptive cruise control apparatus considering a traffic condition according to exemplary implementations of the present disclosure.

Referring to FIG. 3, an adaptive cruise control apparatus considering a traffic condition according to an implementation of the present disclosure may determine whether a road around the subject vehicle 10 is congested (S11). The traffic condition may be determined to be congested when an average speed of the forward vehicle 20 is equal to or less than a predetermined first reference speed and the forward vehicle stops more than a predetermined number of times during a predetermined reference time. Alternatively or additionally, the traffic condition may be determined to be congested when an average speed of nearby vehicles around the subject vehicle 10 exceeds a first predetermined reference rate set relative to the average speed of the forward vehicle 20. That is, the traffic condition may be determined to be congested when an average speed of the nearby vehicles around the subject vehicle 10 exceeds the average speed of the forward vehicle 20 by a predetermined level.

In some implementations of the present disclosure, when the traffic condition is determined as congested through one of the above-described determination methods, the traffic condition may be finally determined as congested. In some implementations of the present disclosure, when the traffic condition is determined as congested through both of the above-described two determination methods, the traffic condition may be finally determined as congested.

In the case that the traffic condition has been determined as congested, the adaptive cruise control apparatus may limit the acceleration of the subject vehicle 10 (S12). For example, as a method for limiting the acceleration of the subject vehicle 10, the following two methods may be used, among others.

As a first limiting method, in the case that the controller 13 calculates the acceleration by using Equation 1 and controls the power train 17 based on the calculated acceleration, when the speed of the subject vehicle 10 exceeds the speed of the forward vehicle 20 by a predetermined level, the acceleration of the subject vehicle 10 may be limited to 0.

As a second limiting method, in the case that the acceleration calculated based on Equation 1 is greater than a preset maximum allowed acceleration, the calculated acceleration may be ignored, and the acceleration of the subject vehicle 10 may be limited to the preset maximum allowed acceleration.

The first limiting method and the second limiting method may be selectively applied in consideration of various variables such as the magnitude of the maximum allowed acceleration and the application environment set in advance. For example, the second limiting method may be applied again after first applying the first limiting method. Alternatively, the first limiting method can be applied again after applying the second limiting method first.

After the limitation on the acceleration of the subject vehicle 10 is applied, the adaptive cruise control apparatus may determine whether the congested traffic condition is resolved (S13). The congested traffic condition may be determined as resolved when the average speed of the forward vehicle exceeds a predetermined second reference speed and the forward vehicle stops less than a predetermined number of times during a predetermined reference time. Here, the second reference speed may be greater the first reference speed. Alternatively or additionally, the congested traffic condition may be determined as resolved, when an average speed of the nearby vehicles around the subject vehicle 10 does not exceed a second predetermined reference rate set relative to the average speed of the forward vehicle 20. That is, the congested traffic condition may be determined as resolved when an average speed of the nearby vehicle around the subject vehicle 10 is less than the average speed of the forward vehicle 20 by a predetermined level.

In some implementations of the present disclosure, when the congested traffic condition is determined as resolved through one of the above-described determination methods, the traffic condition may be finally determined as non-congested. In some implementations of the present disclosure, when the congested traffic condition is determined as resolved through both of the above-described two determination methods, the traffic condition may be finally determined as non-congested.

The adaptive cruise control apparatus may maintain the limitation on the acceleration of the subject vehicle 10 when the congested traffic condition is determined as not resolved, and release the limitation when the congested traffic condition is determined as resolved (S14).

The adaptive cruise control apparatus according to the present disclosure may provide the conventional cruise control function to the driver when the traffic condition around the subject vehicle 10 is not congested or after the congested traffic condition is determined as resolved (S15).

Figure 4:
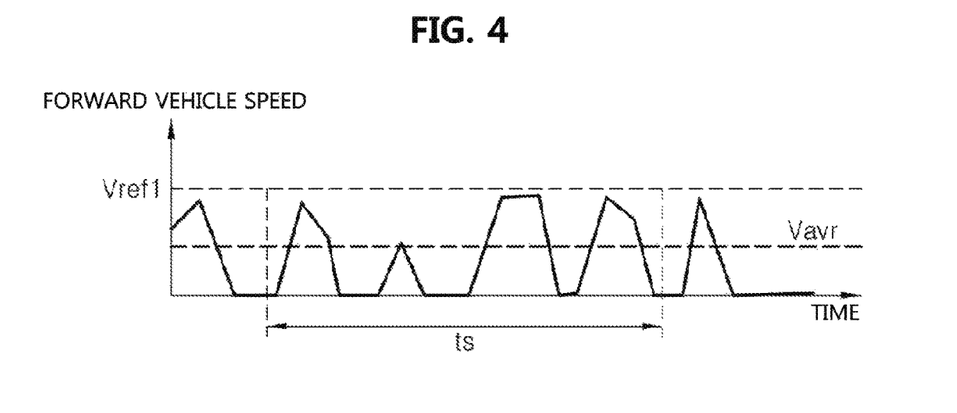
FIG. 4 is a graph for explaining a method of determining whether a traffic condition is congested or not based on an average speed and driving pattern of a forward vehicle in an adaptive cruise control apparatus according to exemplary implementations of the present disclosure.

FIG. 4 is a graph for explaining a method of determining whether a traffic condition is congested or not based on an average speed and driving pattern of a forward vehicle in an adaptive cruise control apparatus according to exemplary implementations of the present disclosure.

Referring to FIG. 4, $V_{ref1}$ may be the first predetermined reference speed, $t_s$ may be the predetermined time, and $V_{avr}$ may be the average speed of the forward vehicle 20 during $t_s$. The adaptive cruise control apparatus may determine the traffic condition as congested when $V_{avr}$ does not exceed $V_{ref1}$ and the forward vehicle 20 stops more than the predetermined number of times during $t_s$ as shown in FIG. 4.

Figure 5:
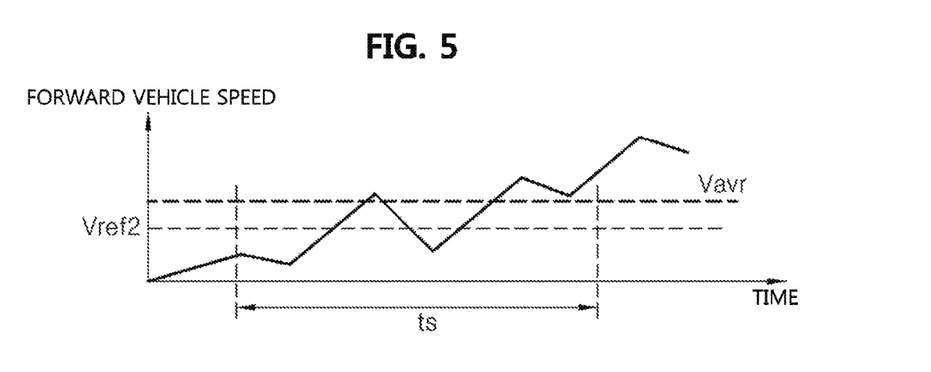
FIG. 5 is a graph for explaining a method of determining whether a congested traffic condition is resolved or not based on an average speed and driving pattern of a forward vehicle in an adaptive cruise control apparatus according to exemplary implementations of the present disclosure.

FIG. 5 is a graph for explaining a method of determining whether a congested traffic condition is resolved or not based on an average speed and driving pattern of a forward vehicle in an adaptive cruise control apparatus according to exemplary implementations of the present disclosure.

Referring to FIG. 5, $V_{ref2}$ may be the second predetermined reference speed, $t_s$ may be the predetermined time, and $V_a$, may be the average speed of the forward vehicle 20 during $t_s$.

The adaptive cruise control apparatus may determine the congested traffic condition as resolved when $V_a$, exceeds $V_{ref2}$ and the forward vehicle 20 stops less than the predetermined number of times during $t_s$ as shown in FIG. 5.

Figure 6:
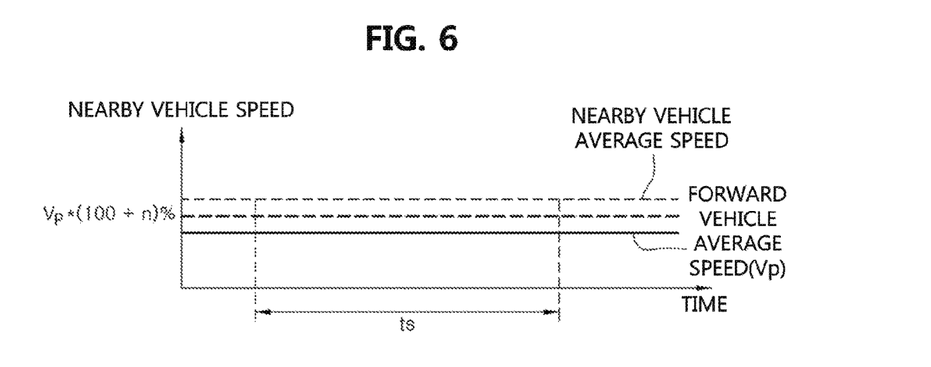
FIG. 6 is a graph for explaining a method of determining whether a traffic condition is congested or not based on an average speed of a nearby vehicle in an adaptive cruise control apparatus according to exemplary implementations of the present disclosure.

FIG. 6 is a graph for explaining a method of determining whether a traffic condition is congested or not based on an average speed of a nearby vehicle in an adaptive cruise control apparatus according to exemplary implementations of the present disclosure.

Referring to FIG. 6, $t_s$ may be a predetermined time, $V_p$ may be an average speed of the forward vehicle 20, $V_p*(100+n)$ % may be a first predetermined percentage of the average speed of the forward vehicle 20. Here, n may be a positive real number.

The adaptive cruise control apparatus may determine that the traffic condition around the subject vehicle 10 is congested when the average speed of the nearby vehicles exceeds $V_p*(100+n)$ % as shown in FIG. 6. That is, the controller 13 in the adaptive cruise control apparatus according to the present disclosure may determine that the traffic condition is congested when the speed of the nearby vehicles is greater than the speed of the forward vehicle 20 by a predetermined level reflected in the value n.

Figure 7:
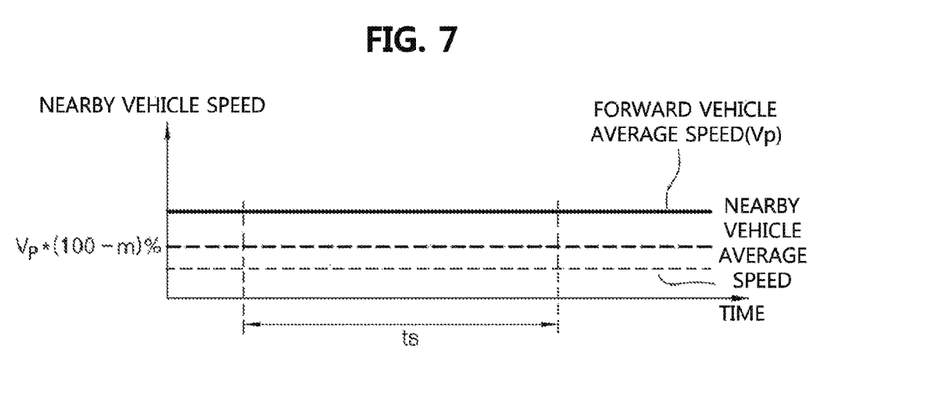
FIG. 7 is a graph for explaining a method of determining whether a congested traffic condition is resolved or not based on an average speed of a nearby vehicle in an adaptive cruise control apparatus according to exemplary implementations of the present disclosure.

FIG. 7 is a graph for explaining a method of determining whether a congested traffic condition is resolved or not based on an average speed of a nearby vehicle in an adaptive cruise control apparatus according to exemplary implementations of the present disclosure.

Referring to FIG. 7, $t_s$ may be a predetermined time, $V_p$ may be an average speed of the forward vehicle 20, $V_p*$ (100−m) % may be a second predetermined percentage of the average speed of the forward vehicle 20. Here, m may be a positive real number.

The adaptive cruise control apparatus may determine the congested traffic condition around the subject vehicle 10 is resolved when the average speed of the nearby vehicles does not exceed $V_p*$(100−m) % as shown in FIG. 7. That is, the controller 13 in the adaptive cruise control apparatus according to exemplary implementations of the present disclosure may determine that the congested traffic condition is resolved when the speed of the nearby vehicles is less than the speed of the forward vehicle 20 by a predetermined level reflected in the value m.

The adaptive cruise control methods according to exemplary implementations of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While some aspects of the preset disclosure have been described in the context of an apparatus, the present disclosure may also represent a description according to a corresponding method, wherein the apparatus or a component of the apparatus corresponds to features of the corresponding method or steps of the method. Similarly, aspects described in the context of a method may also be represented by features of the corresponding apparatus. Some or all of the steps of the method may be performed by (or using) a hardware device such as, for example, a microprocessor, a programmable computer or an electronic circuit. In some implementations, one or more of the most important method steps may be performed by such an apparatus.

In exemplary implementations, a programmable logic device (e.g., a field programmable gate array (FPGA)) may be used to perform some or all of the functions of the methods described herein. In implementations, the FPGA may operate in conjunction with a microprocessor to perform one of the methods described herein. Generally, the methods may be performed by one or more hardware devices.

While the implementations of the present disclosure and their advantages have been described in detail, it should be understood that various changes, substitutions and alterations may be made herein without departing from the scope of the present disclosure.

What is claimed is:

1. An adaptive cruise control apparatus, comprising:
 a sensor device for acquiring information on vehicles around a subject vehicle including information on a distance between a forward vehicle and the subject vehicle, and information on a speed of the forward vehicle and a speed of a nearby vehicle traveling in an adjacent lane to a lane of travel of the subject vehicle; and
 a controller for calculating an acceleration of the subject vehicle based on the information on vehicles around the subject vehicle, determining a traffic condition around the subject vehicle based on the information on vehicles around the subject vehicle, limiting the acceleration of the subject vehicle according to the determined traffic condition, and controlling a power train of the subject vehicle according to the limited acceleration,
 wherein the controller determines that the traffic condition around the subject vehicle is congested according to at least one method of a first method and a second method,
 wherein the first method is based on an average speed of the forward vehicle, a predetermined first reference speed, a number of times the forward vehicle stops, and a predetermined number of stops during a predetermined reference time, and
 wherein the second method is based on an average speed of the nearby vehicles around the subject vehicle and a first predetermined percentage of an average speed of the forward vehicle during the predetermined reference time.

2. The adaptive cruise control apparatus according to claim 1, wherein the controller determines that the traffic condition around the subject vehicle is congested according to the first method when the average speed of the forward vehicle is equal to or less than a predetermined first reference speed and the forward vehicle stops more than the predetermined number of times during the predetermined reference time.

3. The adaptive cruise control apparatus according to claim 2, wherein the controller determines that the congested traffic condition is resolved when the average speed of the forward vehicle exceeds a predetermined second reference speed and the forward vehicle stops less than the predetermined number of times during the predetermined reference time.

4. The adaptive cruise control apparatus according to claim 1, wherein the controller determines that the traffic condition around the subject vehicle is congested according to the second method when the average speed of the nearby vehicles around the subject vehicle exceeds the first predetermined percentage of the average speed of the forward vehicle.

5. The adaptive cruise control apparatus according to claim 4, wherein the controller determines that the congested traffic condition around the subject vehicle is resolved when the average speed of the nearby vehicle does not exceed a second predetermined percentage of the average speed of the forward vehicle.

6. The adaptive cruise control apparatus according to claim 1, wherein the controller limits the acceleration of the subject vehicle by limiting the acceleration of the subject vehicle to zero when the speed of the subject vehicle exceeds the speed of the forward vehicle by a predetermined value or by limiting the acceleration of the subject vehicle to a preset maximum allowed acceleration when the calculated acceleration of the subject vehicle is greater than the preset maximum allowed acceleration.

7. An adaptive cruise control method, comprising:
acquiring information on vehicles around a subject vehicle including information on a distance between a forward vehicle and the subject vehicle, and information on a speed of the forward vehicle and a speed of a nearby vehicle traveling in an adjacent lane to a lane of travel of the subject vehicle;
calculating an acceleration of the subject vehicle based on the information on vehicles around the subject vehicle;
determining a traffic condition around the subject vehicle based on the information on vehicles around the subject vehicle, limiting the acceleration of the subject vehicle according to the determined traffic condition; and
controlling a power train of the subject vehicle according to the limited acceleration,
wherein the determining includes determining that the traffic condition around the subject vehicle is congested according to at least one method of a first method and a second method,
wherein the first method is based on an average speed of the forward vehicle, a predetermined first reference speed, a number of times the forward vehicle stops, and a predetermined number of stops during a predetermined reference time, and
wherein the second method is based on an average speed of the nearby vehicles around the subject vehicle and a first predetermined percentage of an average speed of the forward vehicle during the predetermined reference time.

8. The adaptive cruise control method according to claim 7, wherein the traffic condition around the subject vehicle is determined to be congested according to the first method when the average speed of the forward vehicle is equal to or less than a predetermined first reference speed and the forward vehicle stops more than the predetermined number of times during the predetermined reference time.

9. The adaptive cruise control method according to claim 8, wherein the congested traffic condition is determined to be resolved when the average speed of the forward vehicle exceeds a predetermined second reference speed and the forward vehicle stops less than the predetermined number of times during the predetermined reference time.

10. The adaptive cruise control method according to claim 7, wherein the traffic condition around the subject vehicle is determined to be congested according to the second method when the average speed of the nearby vehicle around the subject vehicle exceeds the first predetermined percentage of the average speed of the forward vehicle.

11. The adaptive cruise control method according to claim 10, wherein the congested traffic condition around the subject vehicle is determined to be resolved when the average speed of the nearby vehicle does not exceed a second predetermined percentage of the average speed of the forward vehicle.

12. The adaptive cruise control method according to claim 7, wherein the acceleration of the subject vehicle is limited by limiting the acceleration of the subject vehicle to zero when the speed of the subject vehicle exceeds the speed of the forward vehicle by a predetermined value or by limiting the acceleration of the subject vehicle to a preset maximum allowed acceleration when the calculated acceleration of the subject vehicle is greater than the preset maximum allowed acceleration.

* * * * *